(12) United States Patent  (10) Patent No.: US 7,032,945 B1
Tiesler  (45) Date of Patent: Apr. 25, 2006

(54) CONFIGURABLE PANEL FOR VEHICLE OVERHEAD CONSOLE

(75) Inventor: John M. Tiesler, Harrison Township, MI (US)

(73) Assignee: Lear Corporation, Southfield, MI (US)

( * ) Notice: Subject to any disclaimer, the term of this patent is extended or adjusted under 35 U.S.C. 154(b) by 1 day.

(21) Appl. No.: 10/904,790

(22) Filed: Nov. 29, 2004

(51) Int. Cl.
*B60R 7/04* (2006.01)
(52) U.S. Cl. .................................. 296/24.34; 296/37.7
(58) Field of Classification Search ............. 296/24.34, 296/37.7, 37.13
See application file for complete search history.

(56) References Cited

U.S. PATENT DOCUMENTS

| 1,790,977 | A | * | 2/1931 | De Boer ..................... 224/547 |
| 4,867,498 | A | * | 9/1989 | Delphia et al. ............ 296/37.7 |
| 5,064,974 | A | * | 11/1991 | Vigneau et al. .......... 200/61.62 |
| 5,186,517 | A | * | 2/1993 | Gilmore et al. ............. 296/214 |
| 5,533,237 | A | | 7/1996 | Higgins |
| 6,428,083 | B1 | | 8/2002 | Dettoni et al. |
| 6,453,522 | B1 | | 9/2002 | Romer Magarino et al. |
| 6,637,795 | B1 | | 10/2003 | Jonardi et al. |
| 6,644,713 | B1 | | 11/2003 | Del Pozo Abejon et al. |
| 2002/0185888 | A1 | | 12/2002 | Jonardi et al. |
| 2004/0160087 | A1 | * | 8/2004 | Tiesler .................. 296/193.04 |

* cited by examiner

*Primary Examiner*—Dennis H. Pedder
(74) *Attorney, Agent, or Firm*—Bir Law, PLC; David S. Bir

(57) ABSTRACT

An inner panel for an overhead console for a vehicle may be secured to an interior of an overhead console door and includes a plurality of slots arranged in a pattern to facilitate sliding and locking attachment of a plurality of accessory holders. The plurality of slots includes at least two generally parallel slots to facilitate insertion and sliding of corresponding tabs of the accessory holder between an insertion position and a locking position and at least one skew slot adapted to receive a corresponding tab of the accessory holder in the locking position and retain the accessory holder in the locking position.

16 Claims, 2 Drawing Sheets

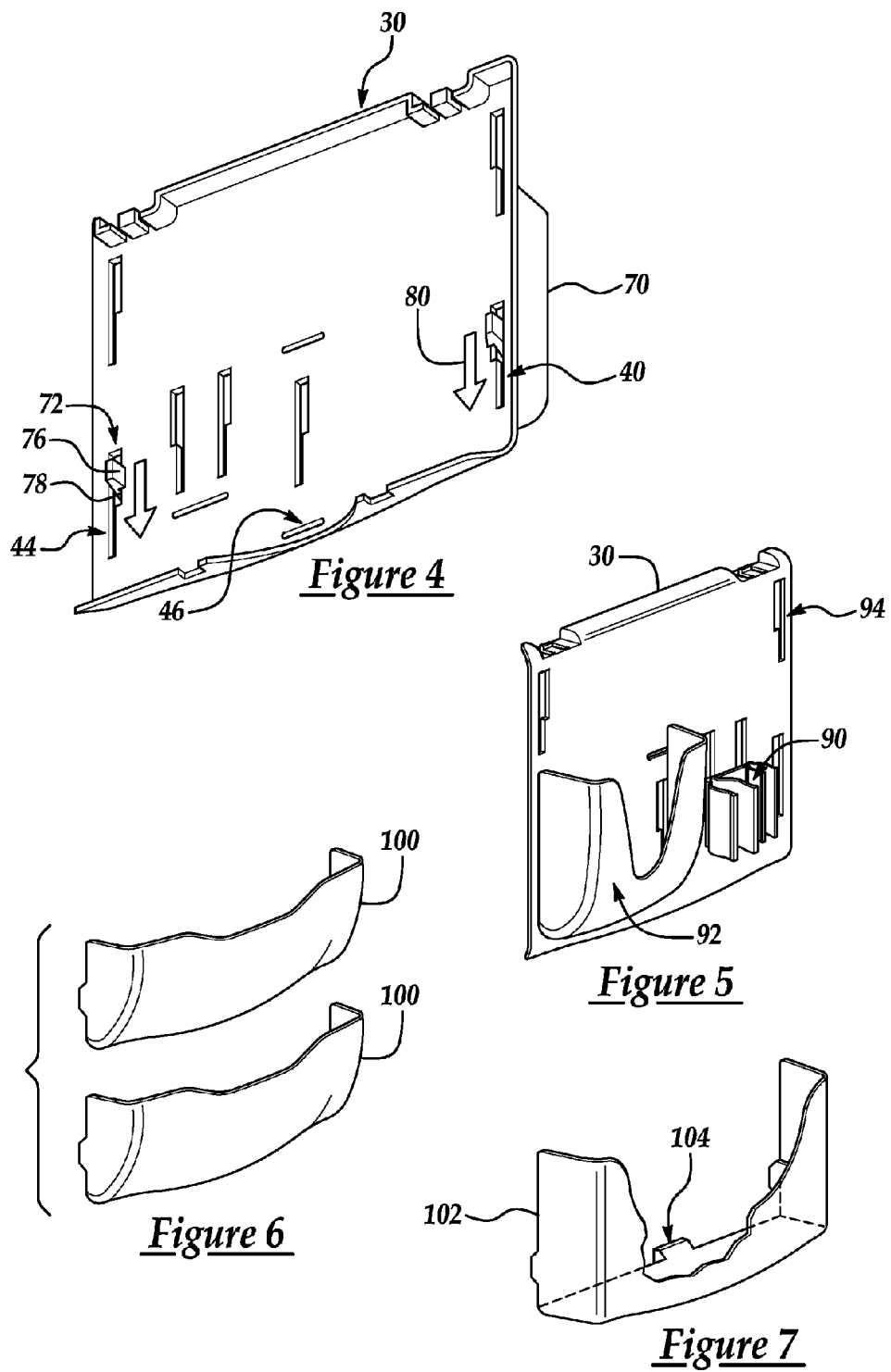

CONFIGURABLE PANEL FOR VEHICLE OVERHEAD CONSOLE

FIELD OF THE INVENTION

The present invention relates to systems and methods for securing various accessory holders to a common panel for an overhead console in a vehicle.

BACKGROUND ART

Overhead consoles are often included in the interior of vehicles, such as automobiles, trucks, airplanes, and marine vehicles, to provide convenient storage of personal items and/or access to vehicle or accessory controls. For example, an overhead console may include various general or specialized compartments for storing items such as CD's, sunglasses, coins, maps, and the like as well as control panels for operating accessories such as interior or exterior vehicle lights, audio/video equipment, garage door openers, etc. Typical overhead consoles may include one or more panels or doors to access the various storage compartments having dedicated or specialized accessory holders in each door that do not provide flexibility for either the vehicle manufacturer or the consumer. In addition, vehicle component suppliers may supply overhead console components or assemblies for multiple vehicle models to multiple manufacturers and are required to design and stock multiple parts for various configurations.

SUMMARY OF THE INVENTION

The present invention includes a panel for an overhead console for a vehicle. The panel may be secured to the interior of an overhead console door and includes a plurality of slots arranged in a pattern to facilitate sliding and locking attachment of a plurality of accessory holders. The plurality of slots includes at least two generally parallel slots to facilitate insertion and sliding of corresponding tabs of an accessory holder from an insertion position to a locking position and at least one skew slot adapted to receive a corresponding tab of the accessory holder and retain the accessory holder in the locking position.

Various embodiments of the present invention include an overhead console for a vehicle having a plurality of doors covering corresponding storage compartments, each door having a common inner panel with at least two generally parallel slots and at least one skew slot associated with two of the generally parallel slots, each of the generally parallel slots having a wider portion adapted to receive a tab with a wedge or barb at its distal end and a narrower portion adapted to secure the wedge or barb as the tab moves from an insertion position to a locking position. The overhead console also includes at least one accessory holder having at least two generally parallel tabs corresponding to two of the generally parallel slots and a skew tab corresponding to an associated skew slot, the generally parallel tabs being positionable for sliding engagement with the parallel slots between an insertion position and a locking position with the skew tab being insertable into the skew slot to secure the accessory holder in the locking position. Each common door inner panel may include multiple sets of generally parallel slots each having a corresponding skew locking slot to accommodate various types and sizes of accessory holders. Trim covers may also be provided with similar tabs to engage open slots for aesthetically pleasing appearance and/or to cover any surfaces that may otherwise scratch or damage accessory holder contents.

The present invention provides a number of advantages. For example, the present invention provides a common inner door panel for an overhead console that accommodates customer or manufacturer selectable accessory holders that are secured without mechanical fasteners. The invention provides configuration flexibility for consumers and vehicle manufacturers while reducing the number of required parts to be designed and manufactured by the supplier.

The above advantages and other advantages and features of the present invention will be readily apparent from the following detailed description of the preferred embodiments when taken in connection with the accompanying drawings.

BRIEF DESCRIPTION OF THE DRAWINGS

FIG. 4 is a perspective view of the back side of an inner door panel for an overhead console illustrating engagement of accessory holder tabs according to one embodiment of the present invention;

FIG. 5 is a perspective view of a representative configuration of accessory holders secured to an inner door panel for an overhead console according to one embodiment of the present invention;

FIG. 6 is a perspective view of a representative accessory holder for use with an inner door panel for an overhead console according to one embodiment of the present invention; and FIG. 7 is a partial cut-away view of a representative accessory holder for use with an inner door panel for an overhead console illustrating a skew tab to retain the accessory holder in the locking position according to one embodiment of the present invention.

DETAILED DESCRIPTION OF THE PREFERRED EMBODIMENT(S)

As those of ordinary skill in the art will understand, various features of the present invention as illustrated and described with reference to any one of the Figures may be combined with features illustrated in one or more other Figures to produce embodiments of the present invention that are not explicitly illustrated or described. The combinations of features illustrated provide representative embodiments for typical applications. However, various combinations and modifications of the features consistent with the teachings of the present invention may be desired for particular applications or implementations.

Figure 1:
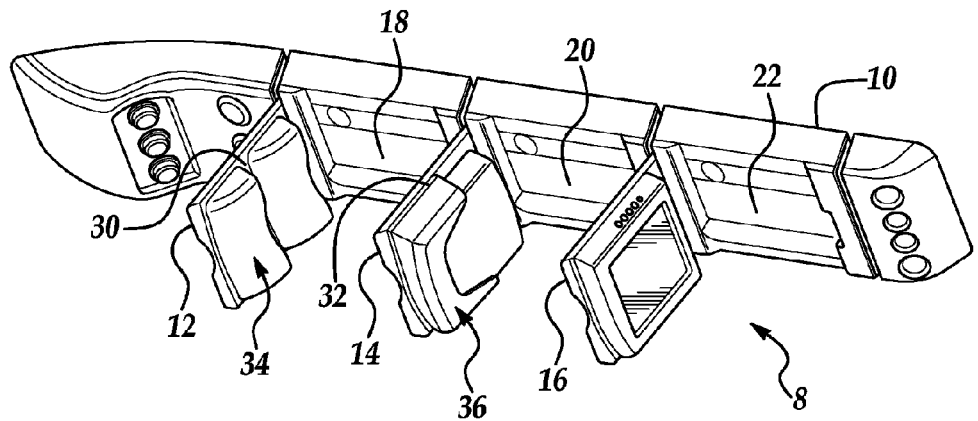
FIG. 1 is a perspective view of a representative application for an overhead console inner door panel according to one embodiment of the present invention.

Referring now to FIG. 1 a representative application for an overhead console inner door panel according to one embodiment of the present invention is shown. In this application, system 8 includes an overhead console 10 for installation in a vehicle (not shown). Overhead console 10 includes a plurality of doors 12, 14, and 16 to provide access to corresponding storage compartments 18, 20, and 22, respectively. In the representative application illustrated, doors 12, 14 include common inner panels 30, 32, respectively, while door 16 has an integrated video screen. Of course, the particular configuration for overhead console 10 may vary depending upon the particular application and implementation. However, in the representative application illustrated, common inner panels 30, 32 are secured to an interior portion of corresponding doors 12, 14 as illustrated and described in greater detail below. One or more accessory holders 34, 36 are secured to common inner panels 30, 32, respectively. Accessory holder 34 is particularly suited to hold various types of personal items, such as sunglasses and the like, while accessory holder 36 is particularly suited for CDs and the like. Various other types of accessory holders may be provided to secure personal items while providing convenient access for vehicle occupants.

Figure 2:
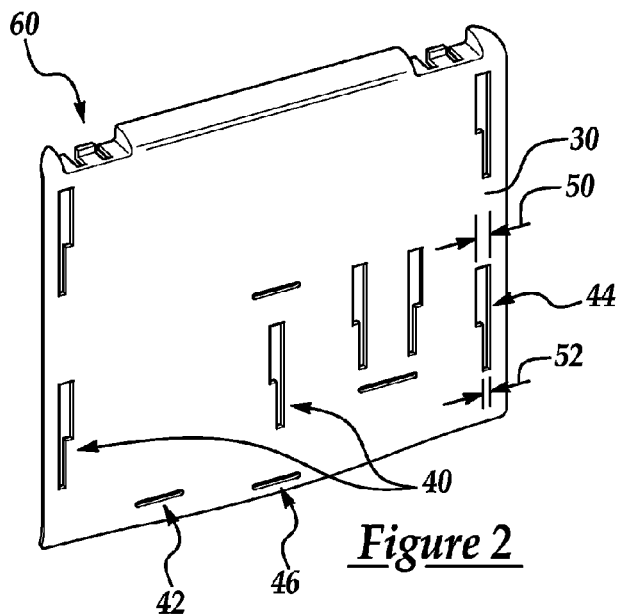
FIG. 2 is a perspective view of the front side of an inner door panel for an overhead console having sliding and locking slots adapted to secure various accessory holders according to one embodiment of the present invention.

FIG. 2 is a perspective view of the front side of an inner door panel for an overhead console having sliding and locking slots adapted to secure various accessory holders according to one embodiment of the present invention. Inner panel 30 includes at least two generally parallel slots 40 and at least one skew slot 42 associated with two of the generally parallel slots. As will be appreciated by those of ordinary skill in the art, skew slot 42 may be positioned at various locations relative to associated parallel slots 40 while providing the desired functionality as described in greater detail below. In the representative embodiments illustrated, skew slot 42 is positioned at the approximate midpoint of the two associated parallel slots 40. Although the embodiments illustrated have skew slots oriented generally perpendicular to associated parallel slots, one or more skew slots may be positioned at any angle sufficient to prevent the associated accessory holder parallel tabs from disengaging parallel slots 40, 44. As illustrated in the embodiment of FIG. 2, a common parallel slot, such as the outward one of slots 40, may be associated with an alternative parallel slot 44 to accommodate alternative accessory holders having different widths, for example. As such, parallel slots 40, 44 may not necessarily occur in pairs or even numbers. Likewise, some accessory holders may engage only a single parallel slot, or may engage multiple slots depending on the particular size and type of holder. In the representative application illustrated, an alternative skew slot 46 may be associated with corresponding parallel slots 44 and the outward one of slots 40. Stated differently, inner panel 30 includes a common parallel slot with first and second associated alternative parallel slots to accommodate accessory holders having different sizes or configurations. A first skew slot is associated with the common parallel slot and the first alternative parallel slot, while a second skew slot is associated with the common parallel slot and the second alternative parallel slot. This configuration reduces the number of parallel slots required in a particular inner door panel while maintaining configuration flexibility by accommodating multiple accessory holders.

As also shown in FIG. 2, each of the generally parallel slots 40, 44 includes an insertion position having a wider opening 50 and a locking position having a narrower opening 52. Generally parallel slots 40, 44 are arranged in a pattern to facilitate sliding and locking attachment of a plurality of accessory holders, such as accessory holder 70 of FIG. 3. As also shown in FIG. 2, inner panel 30 includes a plurality of tabs 60 to secure the inner panel to an interior portion of an overhead console door, such as door 12 or 14 (FIG. 1). The arrangement of a plurality of slots in a door panel attachable to an overhead console door according to the present invention allows the use of a common inner door panel for multiple applications while providing multiple flexible configurations that can be selected by manufacturers and/or consumers. In turn, use of a common inner door panel for multiple manufactures and/or applications provides economies of scale that may reduce design, manufacturing, inventory, and/or other costs for the supplier.

Figure 3:
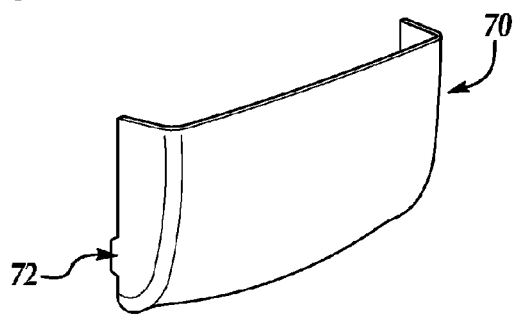
FIG. 3 is a perspective view of a representative accessory holder for use with an overhead console inner door panel according to one embodiment of the present invention.

FIG. 3 is a perspective view of a representative accessory holder for use with an overhead console inner door panel according to one embodiment of the present invention. Accessory holder 70 provides an open-ended compartment or bin for general-purpose storage of personal items. As shown in FIGS. 2 and 3, accessory holder 70 may be secured to inner panel 30 by inserting corresponding tabs 72 of accessory holder 70 into insertion opening 50 of the outward one of alternative slots 40 and slot 44 of inner panel 30, and sliding accessory holder 70 toward a locking position (down in this example) to engage a skew tab (not shown) located on the bottom of accessory holder 70 in associated skew slot 46. Parallel tabs 72 extend from accessory holder 70 with a first cross-sectional area and terminate with a second cross-sectional area greater than the first cross-sectional area (best shown in FIG. 4) to facilitate retention of the tabs within the second, narrower portion of the corresponding parallel slots 40, 44. In one embodiment, tabs 72 terminate with a barb or wedge that has a width greater than the width of the locking position of the corresponding parallel slot to secure accessory holder 70 to inner panel 30 in the locking position. Similarly, accessory holder 70 may include a skew tab having a projection that provides interference with the corresponding skew slot 46 to secure the skew tab within the skew slot. Interference may be provided by a small barb, wedge, arrowhead, or the like on the terminal portion of the skew tab.

FIG. 4 is a perspective view of the back side of an inner door panel for an overhead console illustrating a method for engagement of accessory holder tabs according to one embodiment of the present invention. Tabs 72 of accessory holder 70 extend through the insertion portion of parallel slots 40, 44 of inner panel 30. Tabs 72 terminate with a barb or wedge-shaped portion 76 that projects from accessory holder 70 via a thinner or narrower shaft or shank 78. Accessory holder 70 is moved in the direction of arrows 80 from the insertion position to the locking position such that the skew tab of accessory holder 70 engages skew slot 46 of inner panel 30 to retain accessory holder 70 in the locking position. As shown in FIG. 4, the width of terminal portion 76 of tabs 72 exceeds the width of the locking position for slots 40, 44 so that accessory holder 70 is secured to inner panel 30. Likewise, the cross-sectional area of terminal portion 76 is greater than the cross-sectional area of the shaft or shank 78 extending from accessory holder 70 to terminal portion 76.

FIG. 5 is a perspective view of a representative configuration for accessory holders secured to an inner door panel for an overhead console according to one embodiment of the present invention. Inner door panel 30 includes a first accessory holder 90 particularly suited to hold small objects such as a penlight and pen, for example. As illustrated, a single accessory holder, such as accessory holder 90, may included features particularly suited to secure various types of personal items. Alternatively, or in combination, one or more additional accessory holders such as second accessory holder 92 may also be secured to inner panel 30. Accessory holder 92 includes a cutout portion particularly suited for holding various items to be dispensed, such as facial tissues, a Z-fold notepad, or similar items. Any exposed unused slots, represented generally by reference numeral 94, may be covered with a suitable piece of trim (not specifically illustrated) attached using a similar sliding and locking maneuver for larger pieces of trim, or may be inserted individually for each exposed slot. Accessory holders 90, 92 are attached and secured to inner panel 30 by inserting the generally parallel tabs into corresponding slots and sliding to engage associated skew tabs as described above.

FIGS. 6 and 7 are perspective views of representative accessory holders for use with an inner door panel for an overhead console according to one embodiment of the present invention. Accessory holders 100 of FIG. 6 are particularly suited for holding personal items such as sunglasses, for example. As illustrated, two or more accessory holders 100 may be used on a single inner door panel if desired. FIG. 7 provides a partial cut-away view of accessory holder 102 to illustrate a representative skew tab 104 for engagement with a corresponding skew slot in an inner door panel to secure accessory holder 102 in the locking position as described above. Accessory holder 102 is particularly suited for holding digital media such as CDs, DVDs, and the like.

As illustrated and described with reference to FIGS. 1–7, the present invention provides a common inner door panel for an overhead console that accommodates a variety of accessory holders secured to the inner panel using a sliding and locking strategy so that mechanical fasteners are not required. The present invention also provides a number of configurations using a common inner door panel to give consumers and vehicle manufactures flexibility in configuring an overhead console while reducing the number of required components to be designed, manufactured, and inventoried by the console supplier.

While the best mode for carrying out the invention has been described in detail, those familiar with the art to which this invention relates will recognize various alternative designs and embodiments for practicing the invention as defined by the following claims.

What is claimed is:

1. An overhead console for a vehicle having a plurality of doors covering corresponding storage compartments, the overhead console comprising:
   a common inner panel secured to at least two of the plurality of doors, each common inner panel having at least two generally parallel slots and at least one skew slot associated with two of the generally parallel slots; and
   at least one accessory holder for each common inner panel, each accessory holder having at least two generally parallel tabs and a skew tab corresponding to the parallel slots and skew slot, respectively, of the inner panel, wherein the generally parallel tabs engage a first wider portion of the generally parallel slots and slide to a second narrower portion of the generally parallel slots such that the skew tab engages the skew slot to secure the accessory holder to the inner panel.

2. The overhead console of claim 1 wherein the skew slot of the inner panel and the skew tab of the at least one accessory holder are disposed approximately perpendicular to the generally parallel slots of the inner panel and the generally parallel tabs of the accessory holder, respectively.

3. The overhead console of claim 1 wherein the generally parallel tabs of the accessory holder extend from the accessory holder with a first cross-sectional area and terminate with a second cross-sectional area greater than the first cross-sectional area to facilitate retention of the tabs within the second portion of the generally parallel slots.

4. The overhead console of claim 3 wherein the skew tab extends from the accessory holder and terminates with substantially constant cross-sectional area.

5. The overhead console of claim 1 wherein the inner panel includes two skew slots associated with three parallel slots to accommodate one of two sizes of accessory holders.

6. An inner panel for a door of an overhead vehicle console, the inner panel comprising a plurality of slots arranged in a pattern to facilitate sliding and locking attachment of a plurality of accessory holders, the plurality of slots including at least two generally parallel slots to facilitate insertion and sliding of corresponding tabs of the accessory holder from an insertion position to a locking position and at least one skew slot adapted to receive a corresponding tab of the accessory holder to retain the accessory holder in the locking position.

7. The inner panel of claim 6 wherein the at least two generally parallel slots are wider at the insertion position and narrower at the locking position.

8. The inner panel of claim 6 wherein the at least one skew slot is generally perpendicular to at least two of the generally parallel slots.

9. The inner panel of claim 6 wherein the inner panel includes a common parallel slot and first and second associated alternative parallel slots, a first skew slot associated with the common parallel slot and the first alternative parallel slot, and a second skew slot associated with the common parallel slot and the second alternative parallel slot.

10. The inner panel of claim 6 further comprising a plurality of tabs to secure the inner panel to the door of an overhead console.

11. The inner panel of claim 6 further comprising an accessory holder having at least two generally parallel tabs and an associated skew tab cooperating with corresponding slots of the inner panel to secure the accessory holder to the inner panel.

12. The inner panel of claim 11 wherein the generally parallel tabs terminate with a width greater than the width of the generally parallel slots at the locking position to secure the accessory holder to the inner panel in the locking position.

13. The inner panel of claim 12 wherein the skew tab of the accessory holder includes a projection that provides interference with the skew slot of the inner panel to secure the skew tab within the skew slot.

14. A method for providing an overhead console for a vehicle having a plurality of storage compartments with corresponding doors, the method comprising:
   securing a common inner panel to an interior portion of at least two of the plurality of doors, the common inner panel having at least two generally parallel slots with an associated skew slot; and
   securing at least one accessory holder to the common inner panel by inserting generally parallel tabs into corresponding generally parallel slots on the inner panel and sliding the accessory holder until a skew tab engages the associated skew slot.

15. The method of claim 14 wherein the common inner panel includes generally parallel slots having a wider opening at an insertion position and a narrower opening at a locking position and wherein the step of securing the at least one accessory holder includes inserting the generally parallel tabs into the wider opening and sliding toward the narrower opening to secure the accessory holder to the inner panel.

16. The method of claim 15 wherein the at least one accessory holder includes generally parallel tabs terminate with a width greater than the narrower opening of the generally parallel slots.

* * * * *